L. CARR.
COOKING UTENSIL.
APPLICATION FILED SEPT. 22, 1908.
940,672.
Patented Nov. 23, 1909.
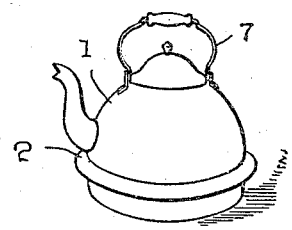
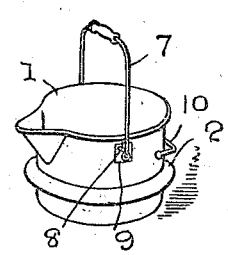
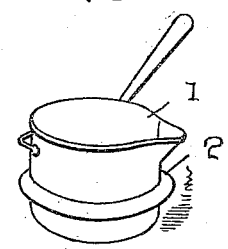
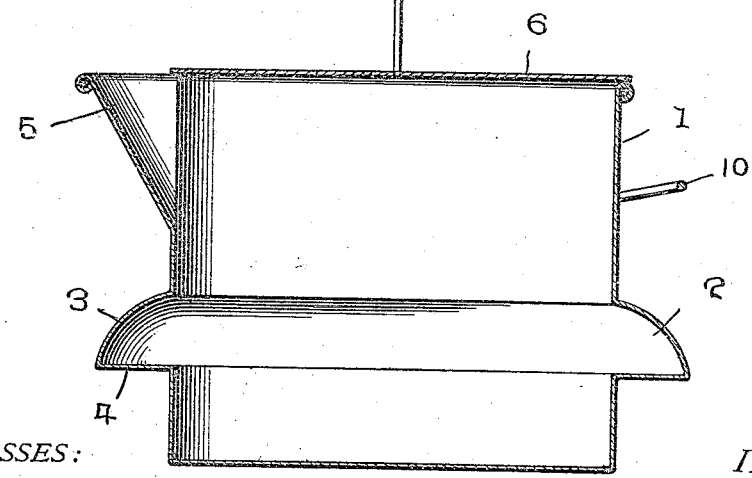
WITNESSES:
INVENTOR
L. Carr
BY
W. J. Fitzgerald & Co.
Attorneys

UNITED STATES PATENT OFFICE.

LAURENCE CARR, OF OAKLAND, CALIFORNIA.

COOKING UTENSIL.

940,672.    Specification of Letters Patent.    Patented Nov. 23, 1909.

Application filed September 22, 1908.   Serial No. 454,257.

*To all whom it may concern:*

Be it known that I, LAURENCE CARR, a citizen of the United States, residing at Oakland, in the county of Alameda and State of California, have invented certain new and useful Improvements in Cooking Utensils; and I do hereby declare the following to be a full, clear, and exact description of the invention, such as will enable others skilled in the art to which it appertains to make and use the same.

My invention relates to new and useful improvement in cooking utensils and my object is to provide means for readily adapting the cooking utensils for fitting various sized openings in stoves.

A further object is to provide means whereby fats and other particles arising from the articles being cooked will readily leave the utensil at a given point and a still further object is to provide an attachment for the utensil whereby the swinging movement of the bail thereon will be limited and the utensil moved back and forth by grasping the attachment.

Other objects and advantages will be hereinafter referred to and more particularly pointed out in the claim.

In the accompanying drawings which are made a part of this application, Figures 1, 2 and 3 are perspective views of various cooking utensils, showing my improved attachments thereon, and, Fig. 4 is an enlarged sectional view through that form of utensil illustrated in Fig. 1, a cover being shown in position over the utensil.

Referring to the drawings in which similar reference numerals designate corresponding parts throughout the several views, 1 indicates the body of the utensil, which may be constructed in the usual or any preferred form and of any suitable material such as sheet tin, cast iron, or the like, said body being provided with an annular projection 2 at a point above the bottom of the utensil, the upper face 3 of said projection being preferably curved or bowed, while the lower face thereof is preferably disposed in a horizontal position to form a shoulder 4, which shoulder is adapted to form a rest for the utensil when the opening in the stove is of greater circumference than the circumference of the base of the utensil.

In that form of utensil shown in Figs. 1, 2 and 4, which are employed for cooking various articles, I provide a substantially V-shaped spout 5, the inclination of said spout being such as to terminate the spout at a point well down from the upper end of the utensil, whereby when articles requiring the addition of water, are being cooked, the absence or consumption of the water may be readily noted without removing the cover 6 from the utensil, the upper end of the spout projecting a distance beyond the periphery of the cover. It will likewise be seen that the fats or other foreign particles arising from the substance being cooked, will enter the spout 5 and as the contents of the utensil reaches a boiling point, will exude from the spout 5, in which event it will not be necessary to remove the cover to skim the foreign particles, as is the common practice.

The utensils having bails 7 thereon, by which means the utensils are readily carried from place to place, are also preferably provided with an L-shaped stop 8, which stop is attached to the ears 9 and at a point above and at one side of the pivotal point of the bail, so that when the bail is swung upwardly to a vertical position, it will encounter the horizontal portion of the stop and limit the swinging movement of the bail in one direction, while if it is desired to shake or rotate the vessel to agitate the contents thereof, the vertical portion of the stop may be readily grasped and the contents of the vessel agitated and it will further be seen that the stop may be readily grasped and the vessel moved from over the opening in the stove by giving a lateral pull to the stop and sliding the vessel over the surface of the stove.

In some instances the vessel, in addition to the bail 7, is provided with a handle 10, which is preferably attached to the outer wall of the utensil and at a point diametrically opposite the spout 5, whereby when it is desired to remove the fluid contents of the vessel, said vessel may be tilted by supporting the vessel by the bail 7 and giving a lifting movement to the handle 10.

When the utensil is formed of sheet metal, the projection 2 and spout 5 may be readily formed by bending out portions of the metal and shaping the same as described, while if the utensil is made of cast metal, the spout and projection may be readily formed and shaped in the casting process. It will also be seen that by providing the projection 2, the utensil may be readily used in connection with stoves having various sized openings in the top thereof and it will further be seen that by providing the curved face 3 on the projection, should the contents of the vessel overflow, the fluid will be deflected by the curved portion 3 and carried away from the fire or blaze in the stove.

While I have shown and described the attachments as secured to a particular class of utensils, it will be readily understood that the attachments may be applied to any suitable form of utensil.

What I claim is:

A culinary or cooking utensil having arranged bodily therein an outstanding annular portion with its lower face standing at right angles to said body and its upper surface or face rounded outwardly from the latter, said lower face of said outstanding portion being adapted to overlie a stove opening while said upper surface or face of said outstanding portion is adapted to form a baffle as against the overflowing contents of the vessel entering the stove opening.

In testimony whereof I have signed my name to this specification in the presence of two subscribing witnesses.

LAURENCE CARR.

Witnesses:
THOMAS ROSS,
JOHN LEITCH.